United States Patent [19]
Hodges et al.

[11] Patent Number: 6,035,423
[45] Date of Patent: Mar. 7, 2000

[54] METHOD AND SYSTEM FOR PROVIDING AUTOMATED UPDATING AND UPGRADING OF ANTIVIRUS APPLICATIONS USING A COMPUTER NETWORK

[75] Inventors: Vernon Hodges, Palo Alto; Shawn O'Donnell, Sunnyvale, both of Calif.

[73] Assignee: Network Associates, Inc., Santa Clara, Calif.

[21] Appl. No.: 09/001,611

[22] Filed: Dec. 31, 1997

[51] Int. Cl.[7] .............................. G06F 11/00; G06F 13/00; G06F 15/176

[52] U.S. Cl. .............................. 714/38; 713/201; 709/219

[58] Field of Search ................................ 395/185, 4, 300; 709/217, 219, 225, 229, 230, 250; 713/201; 714/38

[56] References Cited

U.S. PATENT DOCUMENTS

| | | | |
|---|---|---|---|
| 5,623,600 | 4/1997 | Ji ........................................ | 395/187.01 |
| 5,732,275 | 3/1998 | Kullick .................................. | 395/712 |
| 5,809,287 | 9/1998 | Stupek .................................. | 395/300 |
| 5,832,208 | 11/1998 | Chen .................................. | 395/187.01 |
| 5,862,325 | 1/1999 | Reed .................................. | 395/200.31 |
| 5,890,129 | 3/1999 | Spurgeon ................................ | 705/4 |
| 5,907,834 | 5/1999 | Kephart .................................. | 706/20 |
| 5,919,247 | 7/1999 | Van Hoff ................................ | 709/217 |
| 5,933,647 | 8/1999 | Aronberg ................................ | 395/712 |
| 5,940,074 | 2/1999 | Britt, Jr. .................................. | 345/333 |

*Primary Examiner*—Joseph E. Palys
*Assistant Examiner*—Willie Martin
*Attorney, Agent, or Firm*—Pennie & Edmonds LLP

[57] ABSTRACT

A method for updating antivirus files on a computer using push technology is disclosed. In a preferred embodiment, updated virus signature files or other updated antivirus information is loaded onto a central antivirus server, while local push agent software is installed on the client computer. When the user of the client computer is connected to the Internet, the push agent software operates in the background to receive updated antivirus files from the central antivirus sever across the Internet, in a manner which is substantially transparent to the user. In another preferred embodiment, antivirus files on a plurality of client computers on a corporate computer network are automatically updated using push technology and automated network installation scripts. A service computer associated with the plurality of client computers receives one or batches of antivirus updates from a central antivirus server across the Internet using push technology. An automatic installation script is executed to install the antivirus updates on the client computers of the corporate computer network with a minimum of involvement from a corporate system administrator or, optionally, no involvement from the corporate system administrator.

2 Claims, 14 Drawing Sheets

| | 1102 | 1104 | 1106 | |
|---|---|---|---|---|
| | 1008A | 486-66 | WIN95 | VIRUS_SIGSW95.DAT<br>Antivirus_AppW95.exe | 5/15/00<br>2/1/00 |
| | 1008B | 486-100 | WIN95 | VIRUS_SIGSW95.DAT<br>Antivirus_AppW95.exe | 5/15/00<br>2/1/00 |
| | 1008C | 486-66 | WIN95 | VIRUS_SIGSW95.DAT<br>Antivirus_AppW95.exe | 5/15/00<br>2/1/00 |
| | 1010 | 686-200 | WIN95 | VIRUS_SIGSW95.DAT<br>Antivirus_AppW95.exe | 5/15/00<br>2/1/00 |
| | 1012A | 586-75 | WIN95 | VIRUS_SIGSW95.DAT<br>Antivirus_AppW95.exe | 5/15/00<br>2/1/00 |
| | 1012B | 586-133 | WIN95 | VIRUS_SIGSW95.DAT<br>Antivirus_AppW95.exe | 5/15/00<br>2/1/00 |
| | 1012C | 586-133 | WIN95 | VIRUS_SIGSW95.DAT<br>Antivirus_AppW95.exe | 5/15/00<br>2/1/00 |
| | 1014 | 686-200 | WIN95 | VIRUS_SIGSW95.DAT<br>Antivirus_AppW95.exe | 5/15/00<br>2/1/00 |
| | 1016A | ALPHA500 | UNIX9 | VIRUS_SIGSUNX9.DAT<br>Antivirus_appUNX9.exe | 6/1/00<br>7/15/00 |
| | 1016B | ALPHA500 | UNIX9 | VIRUS_SIGSUNX9.DAT<br>Antivirus_appUNX9.exe | 6/1/00<br>7/15/00 |
| | 1016C | ALPHA500 | UNIX9 | VIRUS_SIGSUNX9.DAT<br>Antivirus_appUNX9.exe | 6/1/00<br>7/15/00 |
| | 1018 | ALPHA500 | UNIX9 | VIRUS_SIGSUNX9.DAT<br>Antivirus_appUNX9.exe | 6/1/00<br>7/15/00 |
| | ... | ... | ... | ... | ... |
| | ... | ... | ... | ... | ... |
| | ... | ... | ... | ... | ... |

FIG. 11

METHOD AND SYSTEM FOR PROVIDING AUTOMATED UPDATING AND UPGRADING OF ANTIVIRUS APPLICATIONS USING A COMPUTER NETWORK

FIELD OF THE INVENTION

The present invention relates generally to computer systems and computer networks. In particular, the present invention relates to a method and system for maintaining and updating antivirus applications in computers attached to a computer network.

BACKGROUND OF THE INVENTION

The generation and spread of computer viruses is a major problem in modern day computing. Generally, a computer virus is a program that is capable of attaching to other programs or sets of computer instructions, replicating itself, and performing unsolicited or malicious actions on a computer system. Generally, computer viruses are designed to spread by attaching to floppy disks or data transmissions between computer users, and are designed to do damage while remaining undetected. The damage done by computer viruses may range from mild interference with a program, such as the display of an unwanted political message in a dialog box, to the complete destruction of data on a user's hard drive. It is estimated that new viruses are created at a rate of over 100 per month.

A variety of programs have been developed to detect and destroy computer viruses. As is known in the art, a common method of detecting viruses is to use a virus scanning engine to scan for known computer viruses in executable files, application macro files, disk boot sectors, etc. Generally, computer viruses are comprised of binary sequences called "virus signatures." Upon the detection or a virus signature by the virus scanning engine, a virus disinfection program may then be used to extract the harmful information from the infected code, thereby disinfecting that code. Common virus scanning software allows for boot-sector scanning upon system bootup, on-demand scanning at the explicit request of the user, and/or on-access scanning of a file when that file is accessed by the operating system or an application.

In order to detect computer viruses, a virus scanning engine is generally provided in conjunction with one or more files called "virus signature files". The virus scanning engine scans a user's computer files via a serial comparison of each file against the virus signature files. Importantly, if the signature of a certain virus is not contained in any of the virus signature files, that virus will not be detected by the virus scanning engine.

By way of example, and not by way of limitation, one leading antivirus program and its accompanying virus signature files is will be described. It is emphasized that this example is presented only for clarity of presentation, and does not limit the scope or context of the preferred embodiments to certain software packages, software types, or operating system types. Indeed, the preferred embodiments are advantageously applied to many different types of antivirus software programs on many different types of operating systems and computing configurations.

A leading antivirus application, produced by McAfee Associates, is called VirusScan™. VirusScan™ is a software application offered for sale in a variety of outlets and forms. VirusScan™ is accompanied by documentation in printed form (see, e.g., "VirusScan Quick Start Guide", McAfee Associates 1997, accompanying the CD-ROM version of VirusScan for Windows 95, NT, 3.1x, DOS and OS/2), in computer-readable form (see, e.g., the directory \MANUALS on the CD-ROM version of VirusScan for Windows 95, NT, 3.1x, DOS and OS/2), and on the World Wide Web at http://www.mcafee.com. The contents of these documents are hereby incorporated by reference into the present application.

In one form, the VirusScan™ application is adapted for use on a user's client computer running on a Windows 95™ platform. A main routine used by this antivirus application is "SCAN.EXE", a program file that is typically placed in the directory C:\PROGRAM_FILES\MCAFEE\VIRUSSCAN on the user's hard drive. The program SCAN.EXE is adapted to be used for any of the following types of virus scanning: virus scanning of system boot-sectors at startup, on-demand virus scanning at the explicit request of the user, and on-access virus scanning of a file when that file is accessed by the operating system or an application. In the Windows 95™ environment, the Registry files are often modified such that SCAN.EXE is run at computer startup, and also remains resident for scanning all files upon file access.

In a typical configuration, VirusScan™ is used in conjunction with a set of virus signature files having the names CLEAN.DAT, MCALYZE.DAT, NAMES.DAT, and SCAN.DAT. As of McAfee's Oct. 15, 1997 release of version 3010 of its VirusScan™ signature file updates, these virus signature files collectively comprise over 1.6 MB of virus information. In a typical configuration, the files CLEAN.DAT, MCALYZE.DAT, NAMES.DAT, and SCAN.DAT are also placed in the directory C:\PROGRAM_FILES\MCAFEE\VIRUSSCAN on the user's hard drive.

For purposes of clarity and simplicity in describing the background and preferred embodiments, this disclosure will refer to a generic antivirus program "Antivirus_Application.exe" and a generic antivirus signature file VIRUS_SIGNATURES.DAT.

Generally speaking, a recent trend is for manufacturers of antivirus applications to update their virus signature files VIRUS_SIGNATURES.DAT as new viruses are discovered and as cures for these viruses are developed, and to make these updated signature files available to users on a periodic basis (e.g. monthly, quarterly, etc.). For example, an antivirus program manufacturer may post the update file VIRUS_SIGNATURES.DAT on a bulletin board system, on an FTP (File Transfer Protocol) site, or on a World Wide Web site for downloading by users.

FIG. 1 illustrates one serious problem that arises from the constant onslaught of new viruses. FIG. 1 shows a flowchart of steps 100 which can occur when a typical user purchases and loads an antivirus program equipped with virus signature files, but neglects to keep its virus signature files current. At step 102, on a first date such as April 1, Year 0 (Apr. 1, 2000), the user acquires and loads the antivirus application Antivirus_Application.EXE and the signature files VIRUS_SIGNATURES.DAT, the file VIRUS_SIGNATURES.DAT having a last-revised date, for example, of Feb. 1, 2000. At step 104, the Antivirus Application.exe routine and the VIRUS_SIGNATURES.DAT file are successfully run on the user's computer. The user, being satisfied that he or she has adequately protected the computer, does not update the VIRUS_SIGNATURES.DAT file.

However, in the meantime, as shown in FIG. 1 at step 106, on May 15, 2000 a third-party "hacker" develops and begins the distribution and spreading of BAD_APPLE.V, a new virus which replicates itself and destroys user data. At step 108, on Jul. 15, 2000, the antivirus manufacturer who makes Antivirus_Application.exe discovers BAD_APPLE.V. At step 110, that day the manufacturer develops a fix for BAD_APPLE.V and writes its virus signature (along with data to implement the fix) into the next release of VIRUS_SIGNATURES.DAT. At step 112, the antivirus manufacturer releases an updated VIRUS_SIGNATURES.DAT dated Sep. 1, 2000. In addition to containing other virus signatures and fixes, the new VIRUS_SIGNATURES.DAT file contains the virus signature and fix for BAD_APPLE.V.

At step 114, on Jan. 13, 2001, the user from step 104 finally becomes infected by the BAD_APPLE.DAT virus. For example, the user may have borrowed a floppy disk infected with BAD_APPLE.V from a friend, or may have downloaded an application infected with BAD_APPLE.V from the Internet. At that very time, at step 116, the program Antivirus_Application.exe scans the infected program. However, at step 116 the BAD_APPLE.V virus goes undetected by Antivirus_Application.exe because the VIRUS_SIGNATURE.DAT file being used is an old one dated Feb. 1, 2000, and therefore it does not contain the virus signature for BAD_APPLE.V. Because it has remained undetected, at step 118 on Jan. 19, 2001, the BAD_APPLE.V virus destroys data on the user's computer.

The scenario of FIG. 1 is a common manner in which desktop systems that are purportedly "protected" from infection nevertheless become infected by new viruses, and represents a problem unique to computer antivirus applications. Upgrades to antivirus files generally have no effect on the user's usage of the desktop system. As represented by the scenario of FIG. 1, the need for antivirus upgrades is often not realized by a user until it is too late. In another common scenario, the virus scanning Antivirus_Application.exe may itself be outdated, having been superseded by a newer and superior engine. These outdated engines are often unable to detect the new species of viruses, which are constantly evolving, such as "stealth" viruses and "polymorphic" viruses.

Unfortunately, even if the user is comparatively sophisticated in his or her ability to maintain the most recent virus scanning engines and virus signature files, preventable virus infection may still occur. With the proliferation of users on the Internet and World Wide Web, new viruses may be spread almost instantaneously upon their introduction. Unless the user affirmatively checks up on the manufacturer's new releases daily, his or her system may not be protected with the most recent virus signature files and scanning routines available.

FIG. 2 illustrates another practical problem that may arise regarding antivirus software distribution, this time in the context of a typical corporate local area network (LAN). FIG. 2 shows a typical local area network 200 comprising a network server 202, a communications network 204 such as an ETHERNET network, a plurality of user nodes 206A–206N, and an Internet gateway 208. As known in the art, Internet gateway 208 is generally coupled via an appropriate protocol connection to the Internet 210, either through an ISP (Internet Service Provider) or a dedicated connection to the Internet 210.

In a common scenario associated with the environment of FIG. 2, one or more dedicated system administrators 212 have the task of ensuring that the antivirus software on the local desktop machines 206A–206N stays updated. Thus, in the environment of FIG. 2, there are additional layers of complexity associated with the updating of desktop antivirus software in comparison to the single user scenario. In particular, the system administrator 212 must (a) maintain an awareness of all antivirus software needs of the various user nodes 206A–206N, (b) maintain an awareness of all update information relating to the antivirus software, and (c) retrieve and install the latest versions and updates for each user node as soon as those updates become available. While modern antivirus updating systems may allow the system administrator 212 to manually request and receive updates from an antivirus manufacturer FTP or World Wide Web Site 214 across the Internet 210, as shown in FIG. 2, it is nevertheless a labor-intensive task to distribute and install the antivirus updates effectively and rapidly. The antivirus update collection and distribution tasks can readily become difficult to keep up with, especially where a typical corporate network may have a variety of hardware platforms (e.g., IBM, MacIntosh, Sun, Silicon Graphics), and a variety of software platforms (e.g., Windows 95, Windows 3.1, DOS, LINUX, UNIX, MacIntosh), each combination of which will have its own unique set of virus scanning engines and virus signature files. It is well known in the art, for example, that viruses are operating system specific, and so the local client computers 206A–206N of FIG. 2 will likely require several different virus scanning engines and virus signature files. Each of these product lines will likely have distinct and disparate updating schedules, further frustrating the efforts of the system administrator 212.

Accordingly, it would be desirable to provide a method and system for Providing the most up-to-date virus scanning, disinfection, and signature files on a user's computer for protecting against the newest viruses.

It would be further desirable to provide a method and system for the antivirus software updating to be simple and automatic, such that unsophisticated users are consistently provided with the most recent antivirus protection available.

It would be even further desirable to provide a method of antivirus software update distribution which allows a higher frequency of update releases from antivirus software manufacturers for the most up-to-date, or even up-to-the-hour, antivirus protection available.

It would be even further desirable to provide a method of automated antivirus software update distribution to the different types of user nodes of a local corporate network, with minimized intervention required by the system administrator.

SUMMARY OF THE INVENTION

These and other objects are achieved by a method and system for updating local client computers with antivirus software updates from a central antivirus server, the local client computers and the central antivirus server being coupled by a packet-switched network, wherein the antivirus software updates are transferred from the central antivirus server to a given local client computer using a push technology method. The central antivirus server comprises a first database containing information related to the latest antivirus software updates contained on each local client computer, and uses push technology to transmit updated antivirus files if the local client computer's antivirus files are out of date.

In another preferred embodiment, the computer network is a packet-switched network, the central antivirus server is coupled to the computer network using a packet-switched protocol, and each of the plurality of local client computers is coupled to the computer network using a packet-switched protocol. Each client computer intermittently notifies the central antivirus server that the client computer is actively coupled to the computer network. The central antivirus server thereupon evaluates whether that client computer has been sent the most recent antivirus file updates. If the client computer has not been sent the most recent antivirus updates, the central antivirus server transmits updated antivirus files to that client computer over the computer network.

In another preferred embodiment, the computer network is a packet-switched network, the central antivirus server is coupled to the computer network using a packet-switched protocol, and each of the plurality of local computers is coupled to the computer network using a packet-switched protocol. Each local computer has a maximum allowable data rate between itself and the computer network. When a data transfer rate between the computer network and any local computer falls below a first data rate less than the maximum data rate, the excess transport capacity is detected and used to allow transmission of updated virus software files from the central antivirus server to the local computer.

In another preferred embodiment, a plurality of local client computers are coupled to a local area network antivirus server across a local area network. The local area network antivirus server is, in turn, coupled to a central antivirus server across a packet-switched network. The central server uses push technology to automatically transmit antivirus software updates to the local area network antivirus server whenever any of the plurality of local client computers contain antivirus software which is out of date. The central antivirus server additionally transmits instructions to the local area network antivirus server sufficient to allow automatic downloading and installing of the antivirus updates onto the appropriate local client computer with minimized intervention from a system administrator.

Advantageously, in antivirus update distribution systems according to the preferred embodiments described herein, there is an opportunity for minimized latency between the discovery of a new virus by an antivirus manufacturer and the loading of the new protective updates onto user desktops. Because human intervention in the update process is minimized or eliminated altogether at the client desktop, antivirus manufacturers are free to distribute antivirus updates as often as necessary to counteract the latest computer viruses, without the need to worry about overloading users with antivirus update activity.

BRIEF DESCRIPTION OF THE DRAWINGS

FIG. 11 shows a portion of an antivirus update database kept according to a preferred embodiment;

DETAILED DESCRIPTION OF THE INVENTION

Figure 1:
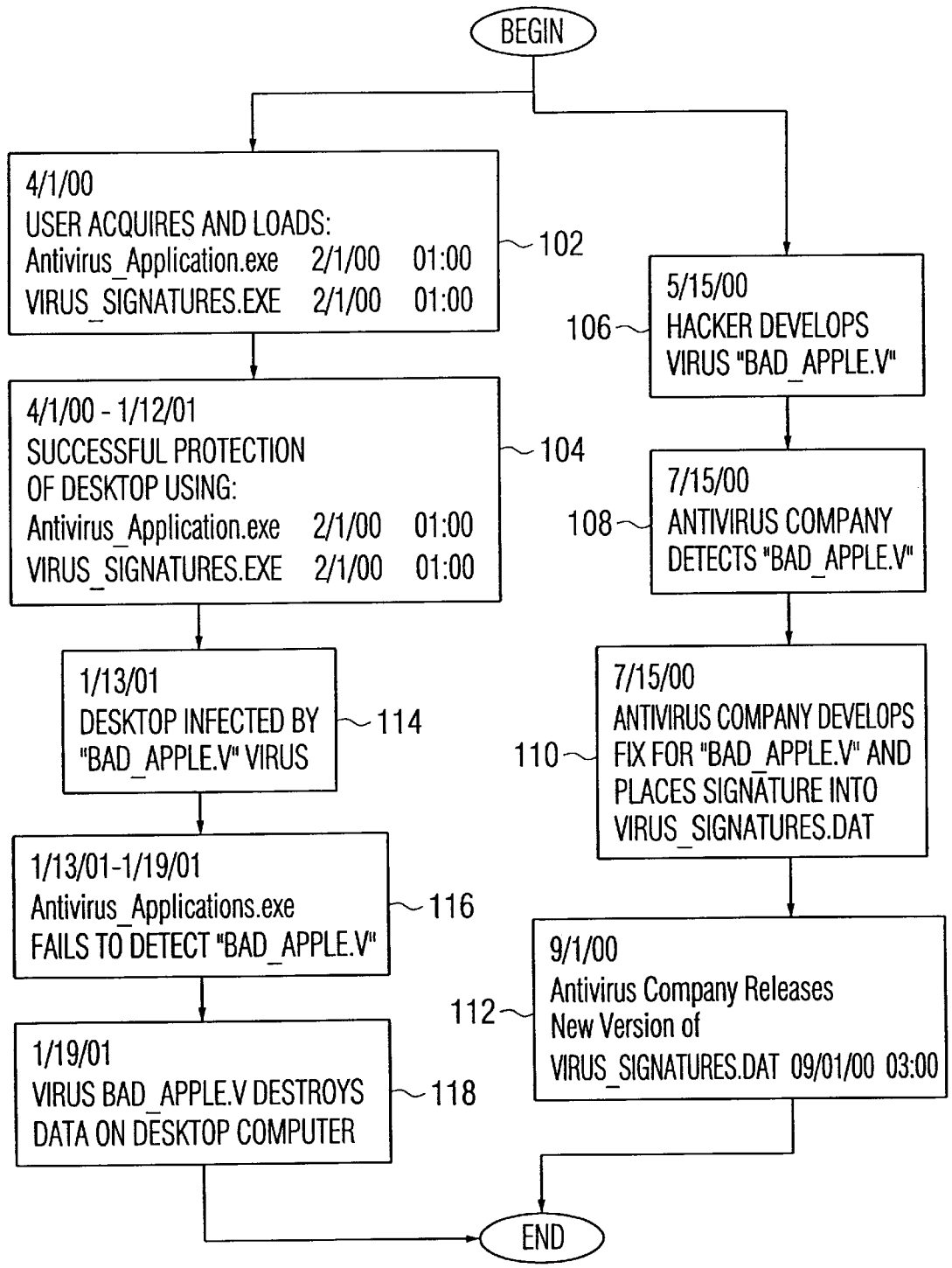
FIG. 1 shows steps corresponding to one prior art scenario of antivirus software distribution and virus infection.
Figure 2:
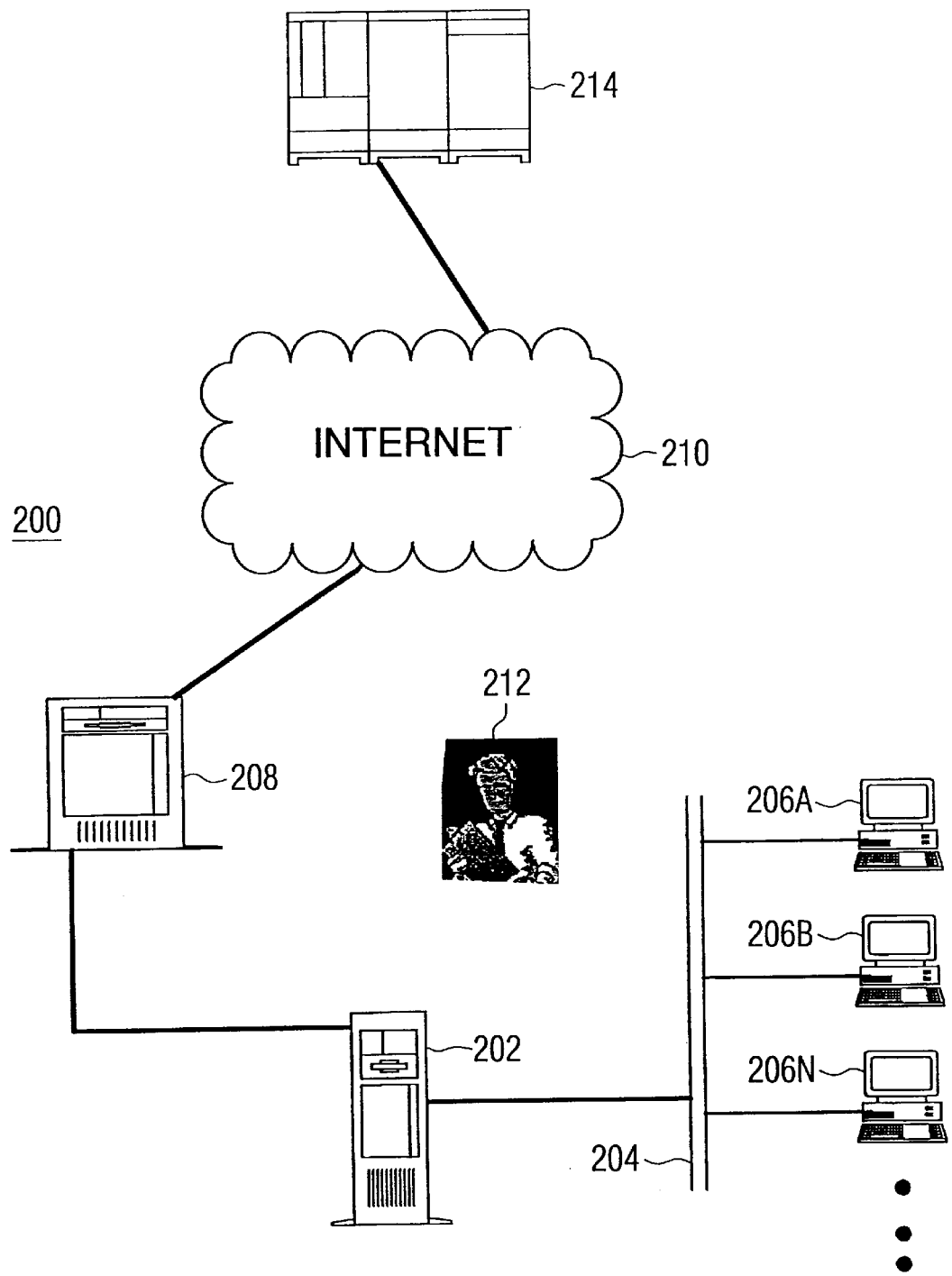
FIG. 2 shows a computer network and an antivirus server coupled to the Internet according to the prior art.
Figure 3:
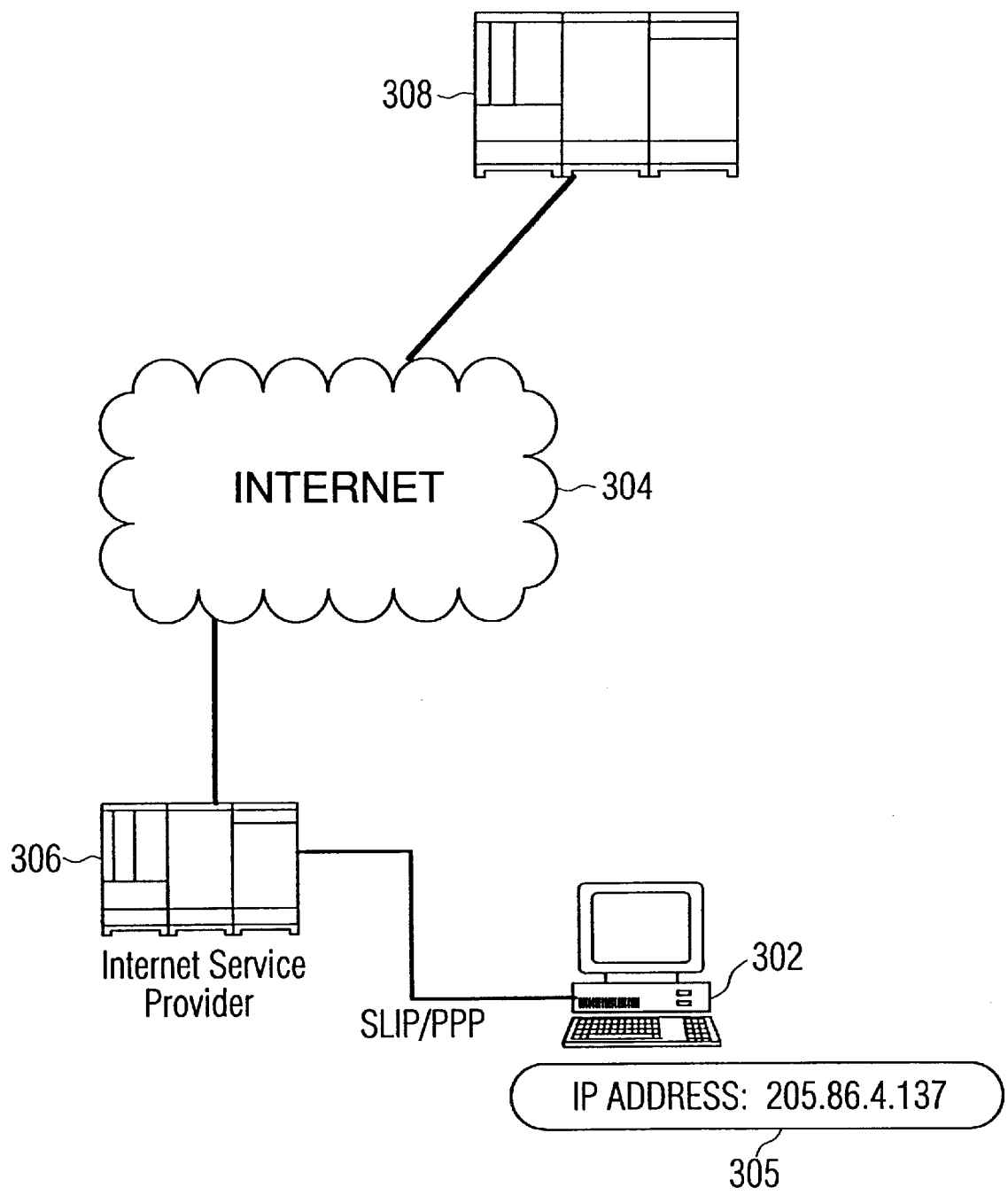
FIG. 3 shows a computer network according to a preferred embodiment.

FIG. 3 shows a computer network 300 according to a preferred embodiment. Computer network 300 comprises a client computer 302. For illustrative purposes, and not by way of limitation, client computer 302 is a Pentium™-based client computer running on a Windows 95 operating system. Client computer 302 has a packet-switched connection to the Internet 304 using any of a variety of connection means known in the art. The embodiment shown in FIG. 3 shows, for example, the client computer 302 coupled to an Internet service provider 306 over a SLIP (Serial Line Interface Protocol) or PPP (Point to Point Protocol) connection. Internet service provider 306 is, in turn, coupled to the Internet 304, the client computer 302 thereby having the ability to send and receive information to other nodes on the Internet 304 using the TCP/IP protocol (Transmission Control Protocol/Internet Protocol).

In the example of FIG. 3, the dial up connection between Internet service provider 306 and client computer 302 is not a permanent connection. Rather, the dial up connection exists only when the client computer 302 dials Internet service provider 304 over the public switched telephone network using a modem. A SLIP or PPP connection is then established between client computer 302 and Internet service provider 306, and client computer 302 is assigned an IP address 305 at that time. Importantly, however, the scope of the preferred embodiment is not necessarily limited to dial-up Internet connections between client computer 302 and the Internet 304. Any of a variety of computer networking connection methods are also within the scope of the preferred embodiment including, but not limited to, a full-time or dedicated connection between client computer 302 and Internet 304, or any other type of connection between client computer 302 and a computer network which assigns client computer 302 an address for allowing the transmission of information to and from client computer 302.

Shown in FIG. 3 is a central antivirus server 308 having a packet-switched connection to Internet 304. Central antivirus server 308 generally comprises a computer that is capable of sending and receiving Information over the Internet 304, capable of storing, retrieving, and maintaining antivirus files, and capable of running other applications. In one form, the central antivirus server 308 comprises a World Wide Web site having a variety of useful antivirus information available to subscribers. Central antivirus server 308 is usually associated with an antivirus software manufacturer, storing and maintaining versions of antivirus application and signature files created by that manufacturer. However, the scope of the preferred embodiment is not so limited, and central antivirus server 308 may also comprise, for example, a general "clearinghouse" of information on a variety of topics, and may be capable of running non-antivirus-related applications.

Using means not shown in FIG. 3, central antivirus server 308 is kept up-to-date with the latest releases of antivirus files, and in the present example is kept up to date with the most recent versions of Antivirus_Application.exe and VIRUS_SIGNATURES.DAT. Importantly, according to a preferred embodiment, the file VIRUS_SIGNATURES.DAT may be updated monthly, weekly, daily or even hourly as newly unleashed viruses are discovered, analyzed, and remedied. Once a virus is remedied, e.g. once its signature is determined, the new signature may be integrated into the file VIRUS_SIGNATURES.DAT by the antivirus application manufacturer.

Figure 4:
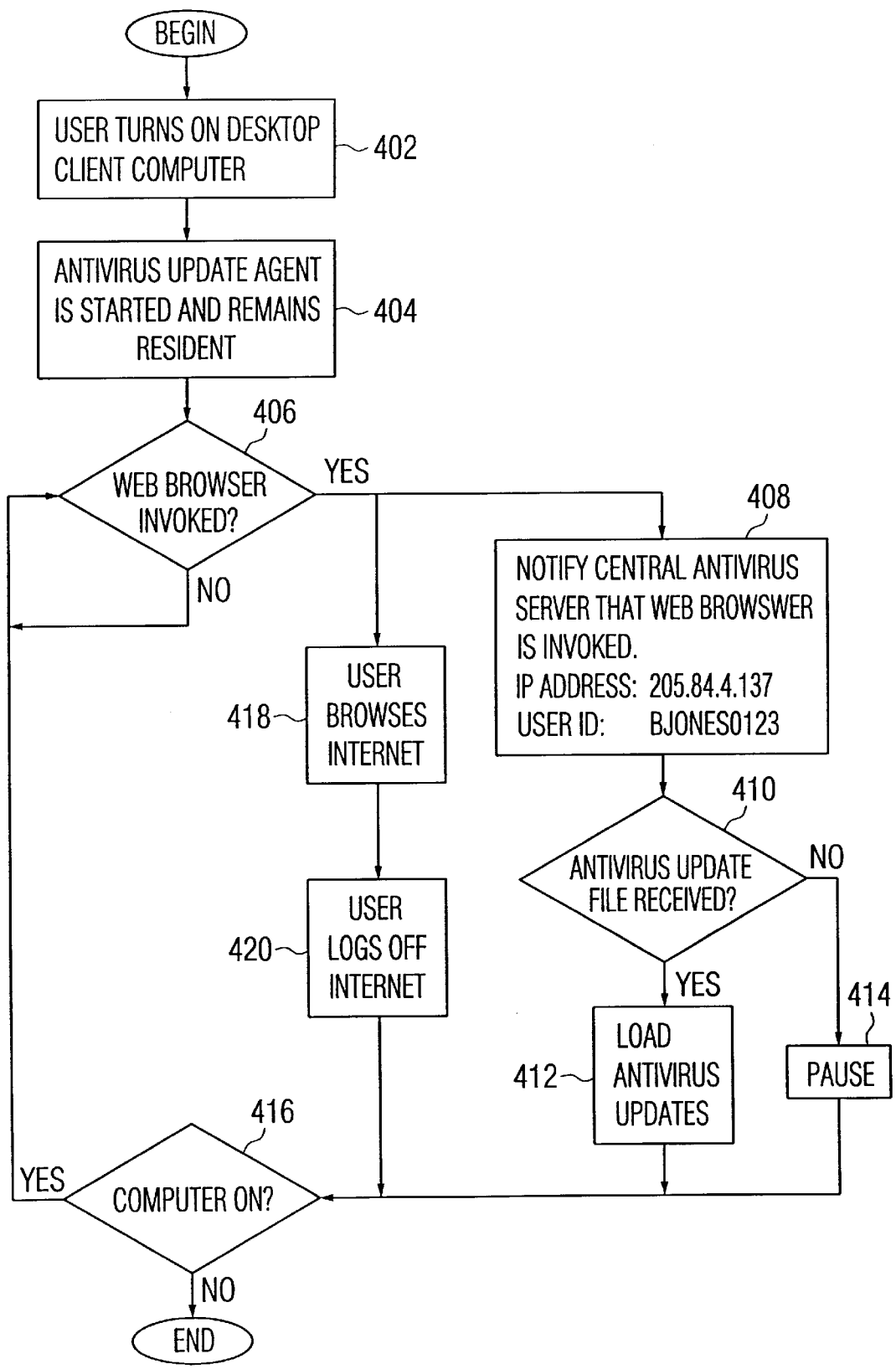
FIG. 4 shows steps taken by a client computer according to a preferred embodiment.

FIG. 4 shows steps taken client computer 302 in accordance with a preferred embodiment. At step 402 the client computer 302 is turned on or otherwise activated. At this time, as known in the art, antivirus application software on client computer 302 is activated, usually automatically. The antivirus application software scans for viruses on client computer 302 by comparing all executable files, macro files, etc. against known virus signatures as contained in a file VIRUS_SIGNATURES.DAT. According to a preferred embodiment, at step 404 a desktop antivirus update agent is started and remains resident in client computer 302.

As shown at step 406, the desktop antivirus agent on client computer 302 generally remains dormant until the client computer 302 is connected to the Internet via a TCP/IP connection and an Internet interface program such as a Web browser is activated. Step 406 is a detection step, wherein the antivirus update agent queries the operating system of client computer 302 for an indication that a TCP/IP connection and that a Web browser has been invoked.

At step 408 the antivirus update agent transmits a sequence of information packets to the central antivirus server 308 for notifying the central antivirus server 308 that a TCP/IP connection and a Web browser have been activated at client computer 302. Among the information transmitted from client computer 302 to central antivirus server 308 are two items of data used for achieving automated download and updating of antivirus files on client computer 302. In particular, (a) the IP address 305 of client computer 302 (e.g., 205.84.4.137), and (b) a unique user ID (e.g., "BJONES01234") are transmitted to central antivirus server 308.

At step 410 antivirus update files are received by client computer 302 if any such files are sent by the central antivirus server 308. If any such files are received, at step 412 the antivirus update files are loaded. If any such files are not received, at step 414 the antivirus update agent pauses for a period of time. Following step 412 or 414, as the case may be, the decision step 406 is again performed if the client computer is still turned on and operating, as reflected by a positive branch at step 416. The loading step shown at FIG. 4 may be an automatic loading step, wherein the downloaded files automatically self-execute and insert the updated file VIRUS_SIGNATURES.DAT into the appropriate directory of the client computer 302. Optionally, according to another preferred embodiment, the downloaded file may cause a "flash" notification to be seen by the user, advising the user that new antivirus files have been downloaded, and that the existing files currently being used in the antivirus application are now outdated. The user may then be given the option to (a) allow the downloaded files to be extracted and installed immediately, or (b) abey the installation process until a later time.

FIG. 4 also shows the step 418, whereby the user browses the Internet normally, followed by the step 420, whereby the user logs off the Internet. Importantly, according to a preferred embodiment, the antivirus updating steps 408–414 carried out in parallel with the steps 418–420, that is, the antivirus updating steps 408–414 are carried out in the "background" and are transparent to the user. In some circumstances there may be slight delays or longer download times caused by the background downloading of the antivirus update files, but the operation of the client computer 302 as seen by the user is generally unaffected.

Figure 5A:
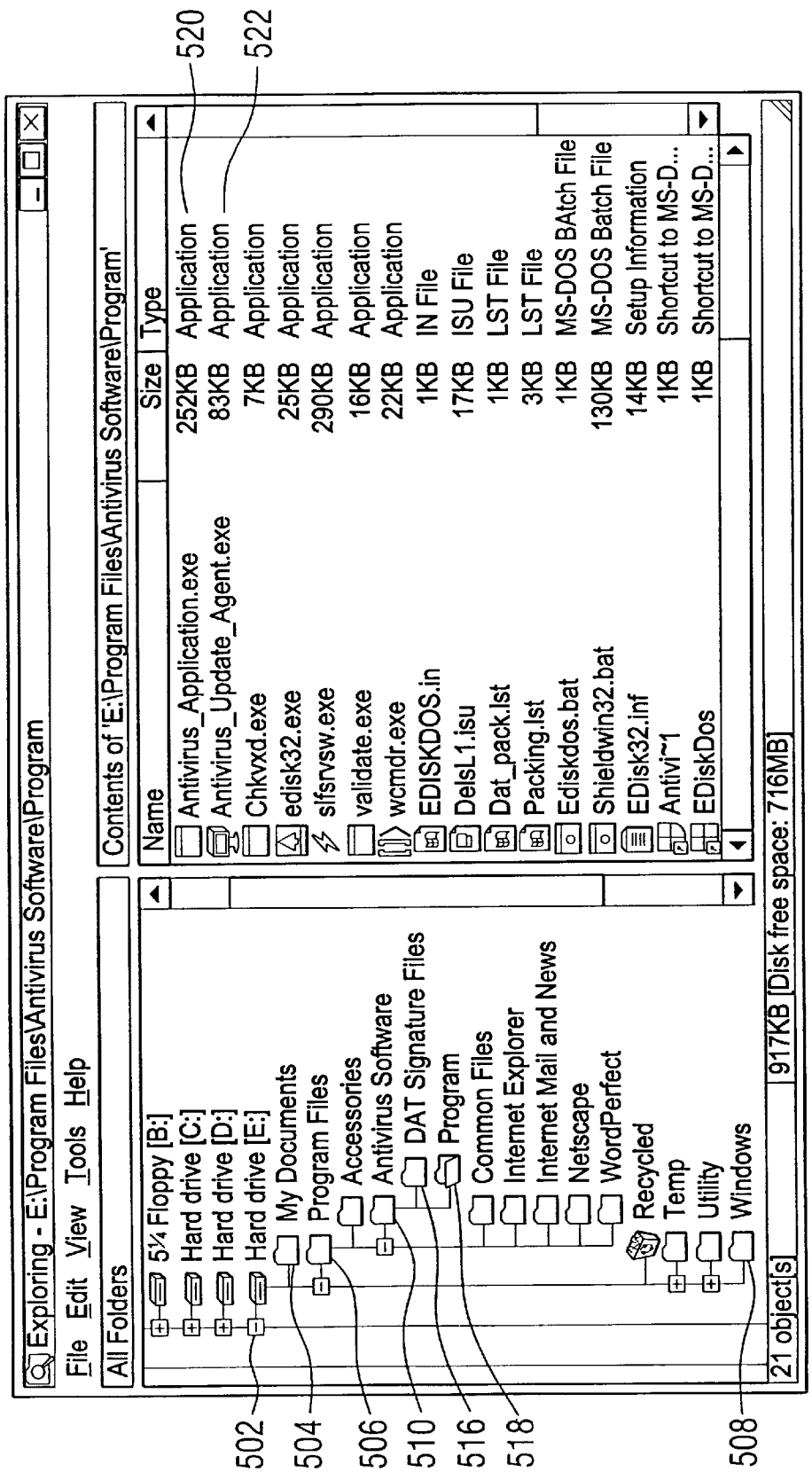
FIGS. 5A and 5B show a sample directory structure and directory listings of client computer files according to a preferred embodiment.

FIG. 5A shows a printout of the directory structure and certain file listings from a hard drive of client computer 302 according to a preferred embodiment. For exemplary purposes, client computer 302 comprises a hard drive E:, shown as element 502 in FIG. 5A, which is loaded with primary operating system and application files, including antivirus software. In accordance with standard Windows 95™ organization methods, hard drive 502 comprises a My Documents directory 504 containing user files, a Program Files directory 506 containing program directories, and a Windows directory 508 containing operating system files. Program Files directory 506 comprises an Antivirus Software directory 510 containing antivirus application and signature files, an Internet Explorer directory 512 containing a Microsoft Internet Explorer™ Web browser, a Netscape directory 514 containing a Netscape Navigator™ Web browser, and other program file directories.

Antivirus Software directory 510 contains a DAT Signature Files directory 516 and a Program directory 518. The contents of Program directory 518 are shown on the right hand side of FIG. 5A. Program directory 518 comprises a first executable file Antivirus_Application.exe 520 and a second executable file Antivirus_Update_Agent.exe 522. As known in the art, at computer startup the program Antivirus_Application.exe 520 is executed or, alternatively, this program can be manually invoked by the user. One manner in which to cause Antivirus_Application.exe 520 to automatically execute at startup is to place a shortcut to this program in the "Startup" portion of the Windows 95™ Start menu system.

According to a preferred embodiment, the program Antivirus_Update_Agent.exe 522 is the program which is designed to perform the steps shown generally in FIG. 4. The program Antivirus_Update_Agent.exe 522 is designed to begin execution at computer startup, either through placement of a shortcut to it in the "Startup" portion of the Windows 95™ Start menu system, or by other methods known in the Windows 95™ programming art. The program Antivirus_Update_Agent.exe 522 is designed to interact with the operating system such that the creation of a TCP/IP connection to the Internet and the invocation of a Web browser is recognized. Once this connection is recognized, the program Antivirus_Update_Agent.exe 522 causes communication with central antivirus server 308 to commence, wherein antivirus updates are received if the current antivirus files are outdated.

Figure 5B:
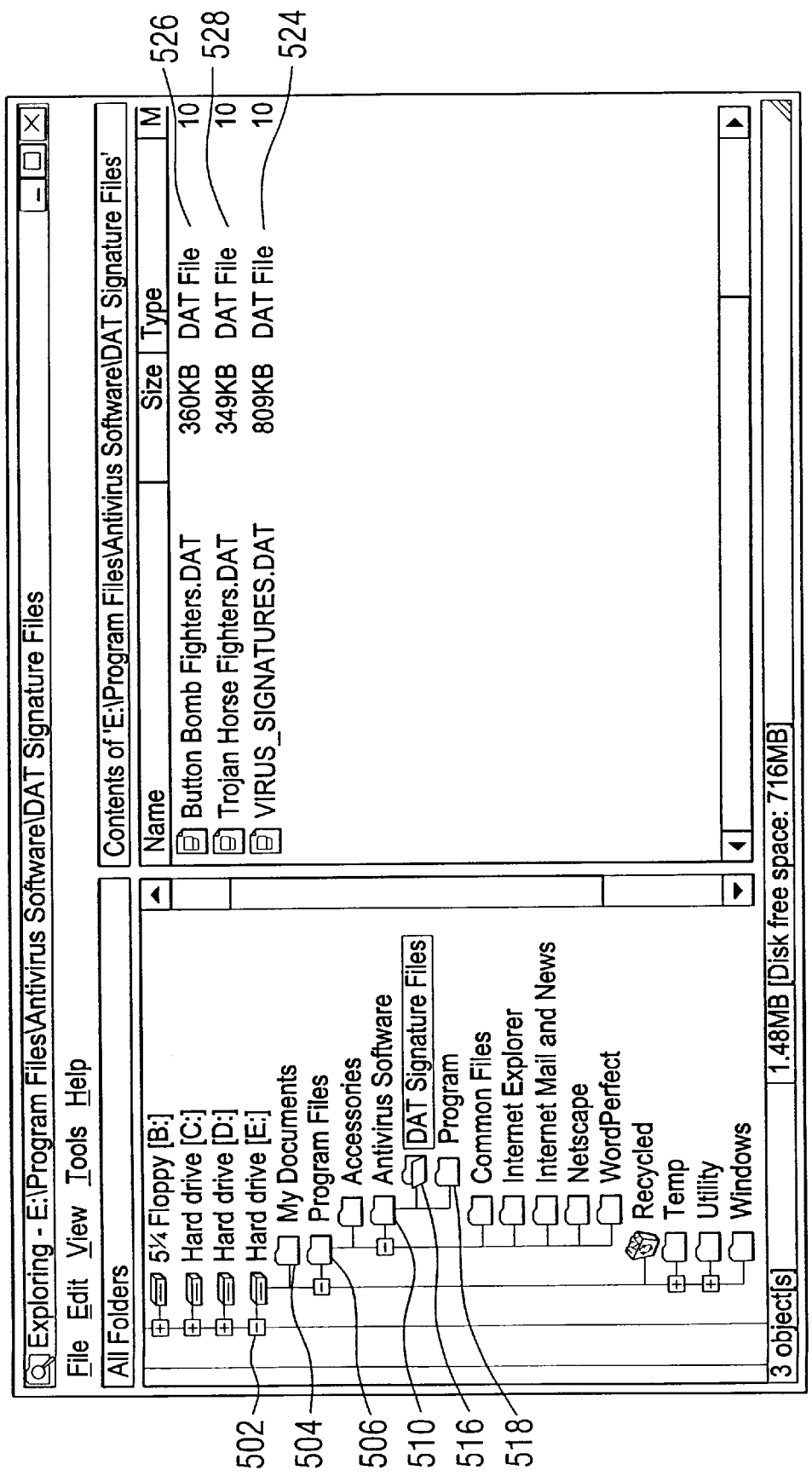

FIG. 5B shows a printout of the directory structure of FIG. 5A except with contents the directory E:\Program Files\Antivirus Software\DAT Signature Files 516 being shown in the right hand window. As shown in FIG. 5B, the exemplary virus signature file VIRUS_SIGNATURES.DAT 524 is contained in the DAT Signature Files directory 516. According to a preferred embodiment, it is the file VIRUS_SIGNATURES.DAT 524 which contains the time-sensitive virus signature information, and which is the file which is most often updated by central antivirus server 308. According to another preferred embodiment, the program file Antivirus_Application.exe 522 is itself updated periodically, as newer scanning approaches are included in the most recent program versions.

According to another preferred embodiment, there are other time-sensitive antivirus data files such as the files Button Bomb Fighters.DAT 526 and Trojan Horse Fighters-.DAT 528 downloaded into the DAT Signature Files directory 516. These additional files, which are designed to counteract the negative effects of the newest types of harmful software unleashed by computer hackers, may be associated into the scanning engine through a linked list provided in the file ANTIVIRUS_SIGNATURES.DAT. Advantageously, the additional files may themselves be executable in nature, in which case these entirely new computer protection applications are automatically and transparently downloaded and installed.

Figure 6:
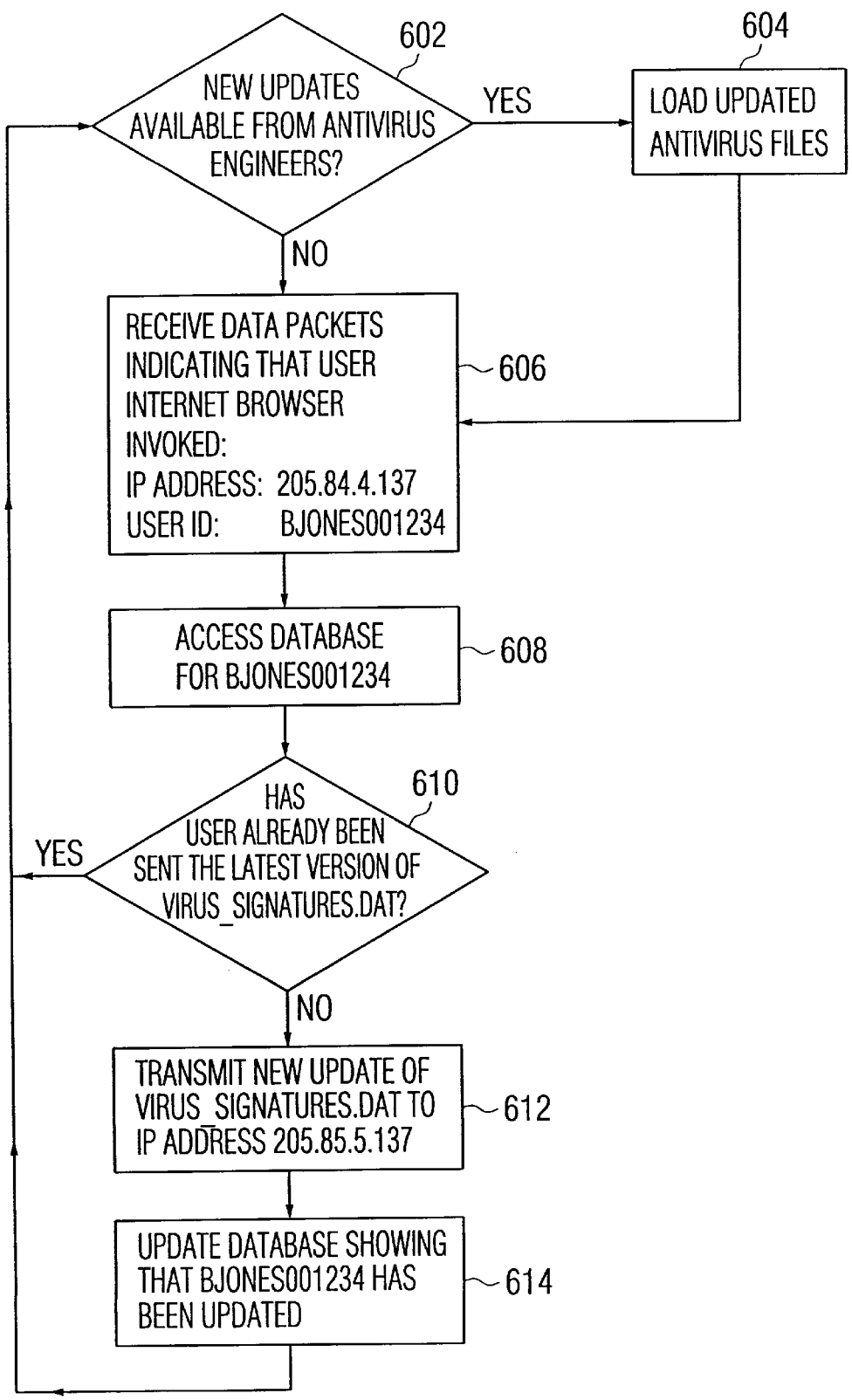
FIG. 6 shows steps taken by a central antivirus server according to a preferred embodiment.

FIG. 6 shows steps taken by central antivirus server 308 in accordance with a preferred environment. At step 602, antivirus server 308 determines whether updated antivirus files from antivirus software developers or engineers is available. If such an update is available, the updated antivirus files are loaded at step 604. For purposes of illustration, and not by way of limitation, the updated antivirus files are stored in a self-extracting archive file called UPDATE_SIGNATURES.EXE. The self-extracting archive file UPDATE_SIGNATURES.EXE comprises a data portion and a program portion. When this is executed at the client computer 302, as described infra, the program portion extracts an updated antivirus file ANTIVIRUS_SIGNATURES.DAT from the data portion and places it into the appropriate directory of client computer 302. Although in the present example only a single data file is stored in the data portion of UPDATE_SIGNATURES.EXE, multiple files may be delivered by the self-extracting archive file UPDATE_SIGNATURES.EXE, including executable programs.

FIG. 6 then shows step 606, wherein central antivirus server 308 receives a notification that the user or computer 302 is connected to the Internet and has an active browser application running. Central antivirus server 308 is provided with that user's identification, e.g. BJONES001234, and his or her associated IP address. At step 608, central antivirus server 308 accesses a subscriber database containing a list of all known or registered subscribers. At step 610, using a database lookup procedure, central antivirus server 308 determines whether that user has been sent the most recently updated antivirus files. If the user has already been sent the latest version of the virus signature files, no action is taken for that user, wherein steps 602–606 are repeated.

However, if it is determined that the user of client computer 302 has not received the latest versions of the virus signature files, new updates are transmitted at step 612. At step 614, central antivirus server 308 then updates the subscriber database to reflect that user BJONES001234 has received the updated antivirus file. Importantly, it is to be appreciated that steps 606–614 are carried out for each of the plurality of subscribers such as BJONES001234. Generally speaking, there may be many such subscribers. Central antivirus server must therefore be equipped with sufficient hardware and database capability to handle the resulting traffic.

Figure 7:
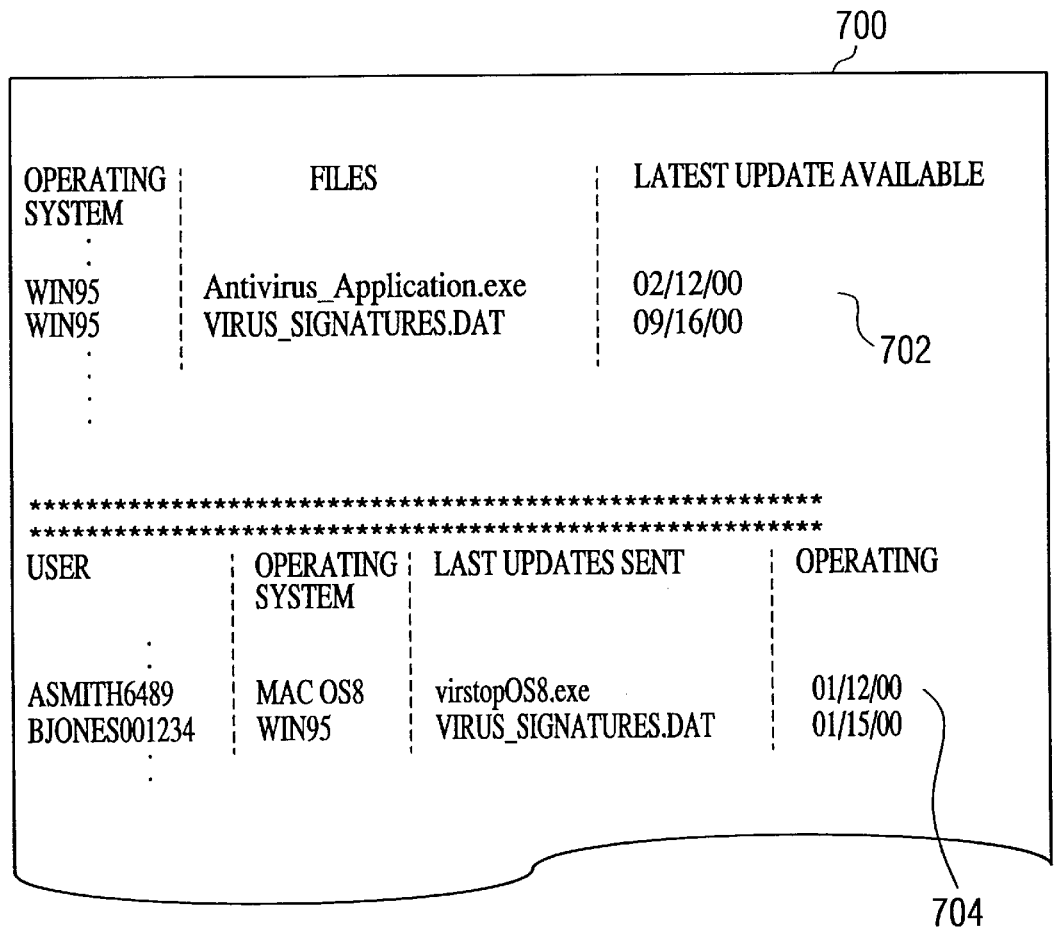
FIG. 7 shows a diagram of a database contained within a central antivirus server according to a preferred embodiment.

FIG. 7 shows a diagram of a database 700 contained within central antivirus server 308. Database 700 comprises an antivirus database 702 and a subscriber database 704 as shown in FIG. 7. Shown in antivirus database 702 are virus signature files and executable program files which represent the latest available versions, along with the operating systems to which they apply. Shown in subscriber database 704 is a list of all known or registered subscribers along with their operating system types and the types and dates of the last updates sent for each subscriber. The data shown in FIG. 7 is for illustrative purposes; other useful information may be also included in database 700. Through the use of database 700, central antivirus server 308 is capable of determining the requirements of each subscriber, and is capable of determining whether a given subscriber is updated with the latest versions of the required antivirus software.

Figure 8:
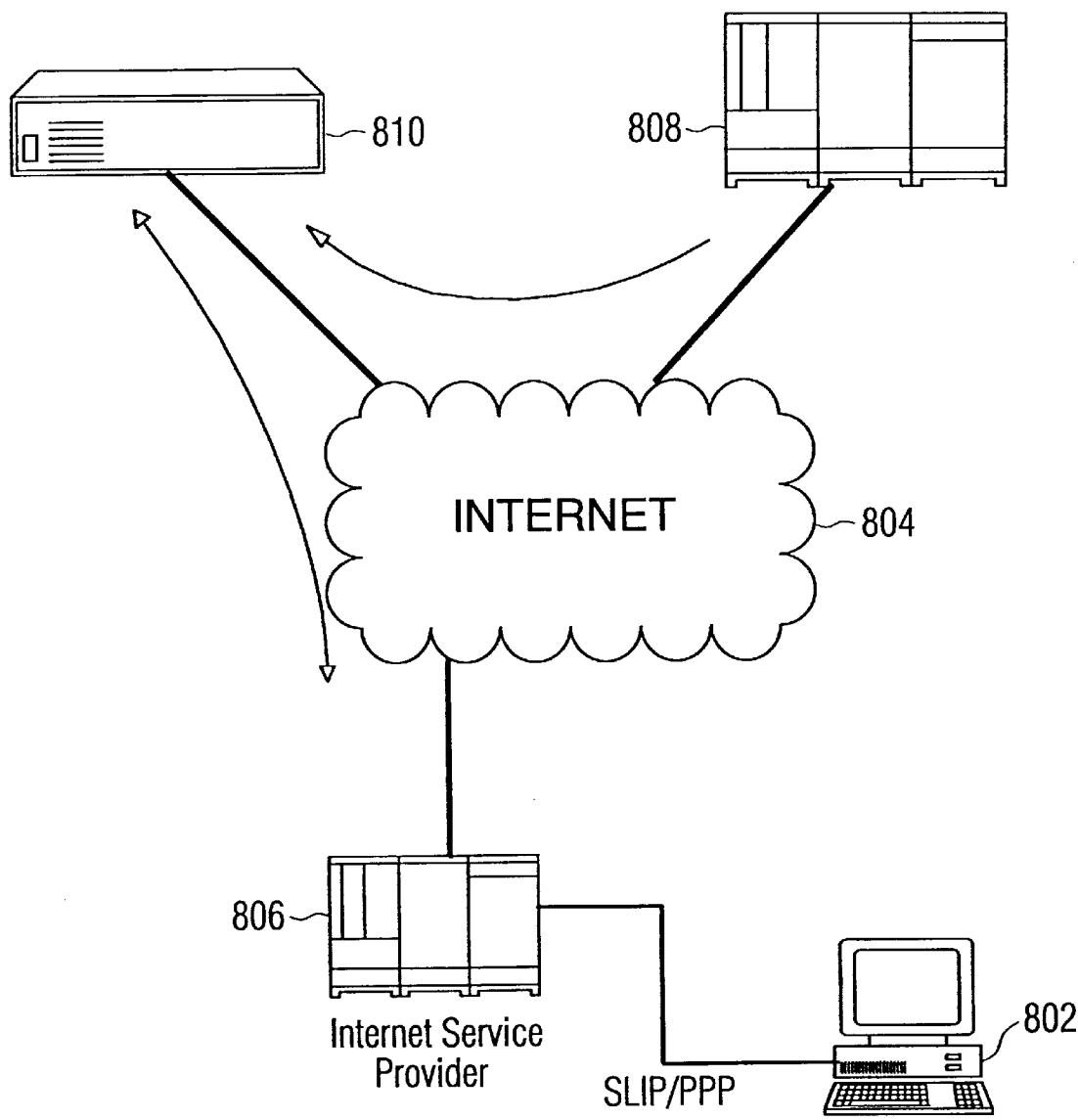
FIG. 8 shows a diagram of a computer network according another preferred embodiment.

FIG. 8 shows a diagram of a commuter network 800 according to another preferred embodiment. It has been found that a mechanism for "pushing" the needed updates to client computers can be efficiently configured using a dedicated push administrator system separate from the central antivirus server 308. In practice, the push administrator is separated from the administrators of the central antivirus server company both physically and organizationally, allowing the antivirus software developer to focus on the antivirus aspects of the updates, and allowing the push administrator to focus on the push delivery mechanism.

Computer network 800 comprises a client computer 802, the Internet 804, and an ISP 806 similar to the elements 302, 304, and 306, respectively, of FIG. 3. Computer network 800 further comprises a central antivirus server 808 coupled to the Internet 804, and a push administration system 810 also coupled to the Internet 804. In the embodiment of FIG. 8, the central antivirus server 808 serves a more limited function than the central antivirus server 308 of FIG. 3. In particular, the central antivirus server 808 has limited interaction with client computer 802, and instead transfers updated antivirus files to the push administration system 810. It is the push administration system 810 that interacts with client computer 802 in a manner similar to the steps 606–614 of FIG. 6, but may optionally interact with client computer 802 with regard to other applications such as technical news updates or application updates. Advantageously, according to the preferred embodiment, the antivirus developers or engineers are permitted to focus on the antivirus aspects of the updates, and the push administration system provider may focus on optimally delivering the information to the client desktop using push technology. Additionally, the user of client computer 802 is attracted to the push administration system because of the variety of useful and/or entertaining information which may be obtained. Together, these elements provide for faster and more efficient distribution and delivery of the latest antivirus software updates to the client computer 802 as compared to prior art antivirus distribution systems.

In general, the push administration system 810 pushes channelized information to the client desktop 802 according to a subscription plan for the user of client computer 802. Antivirus update files are delivered on one of the subscriber channels.

Figure 9A:
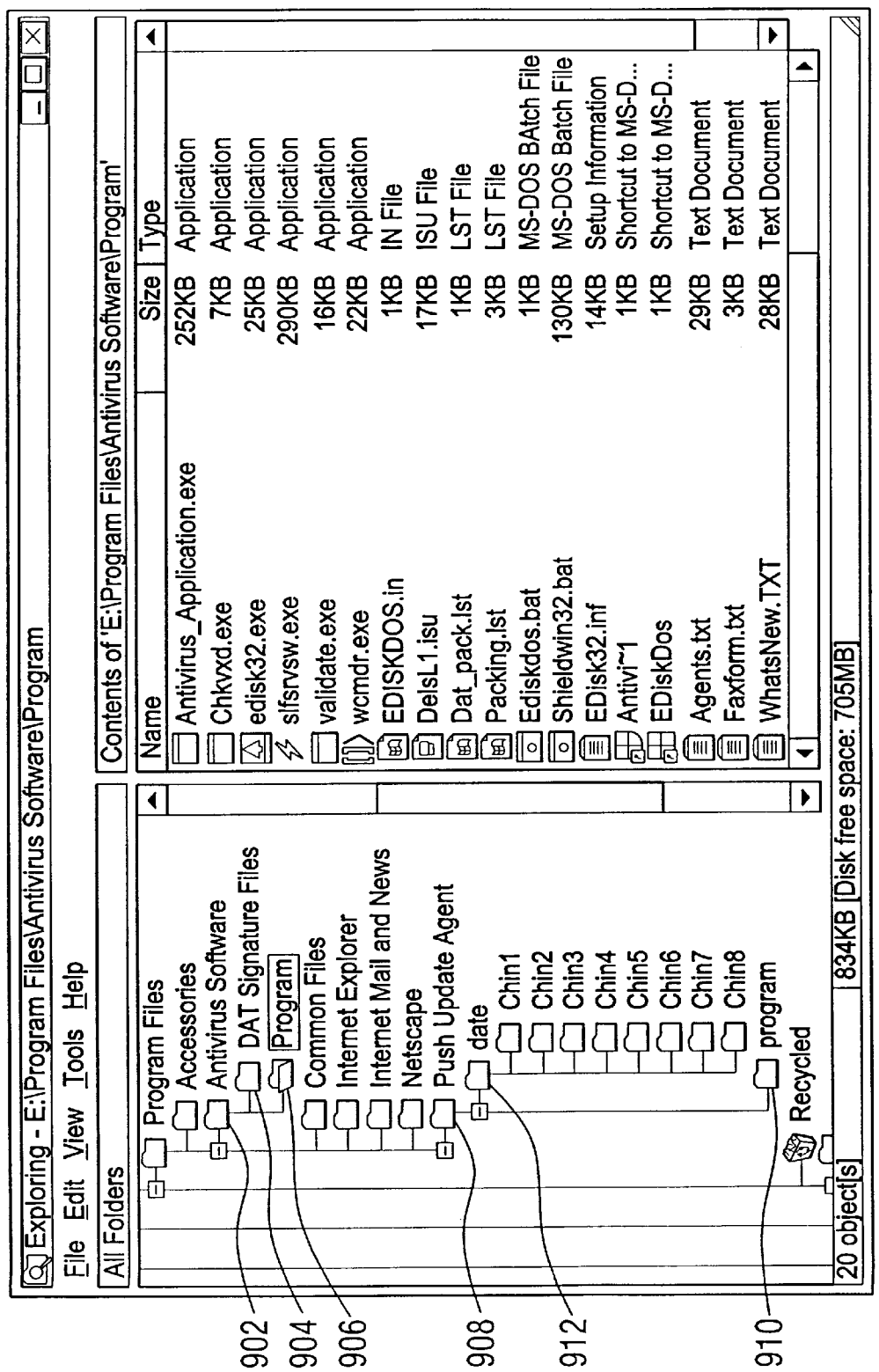
FIGS. 9A and 9B show a sample directory structure and directory listings of client computer files according to another preferred embodiment.

FIG. 9A shows a printout of the directory structure from a hard drive of client computer 802 according to the embodiment of FIG. 8, and in particular shows file listings of an Antivirus Software directory 902 on client computer 802. Similar to the embodiment of FIG. 3, Antivirus Software directory 902 comprises a DAT Signature Files directory 904 and a Program directory 906. However, as shown in the directory listing of FIG. 9B, client computer 802 also comprises a Push Update Agent directory 908. Push Update Agent directory 908 contains a program directory 910 and a data directory 912 that are dedicated for push update applications and for interacting with push administration system 810.

Figure 9B:
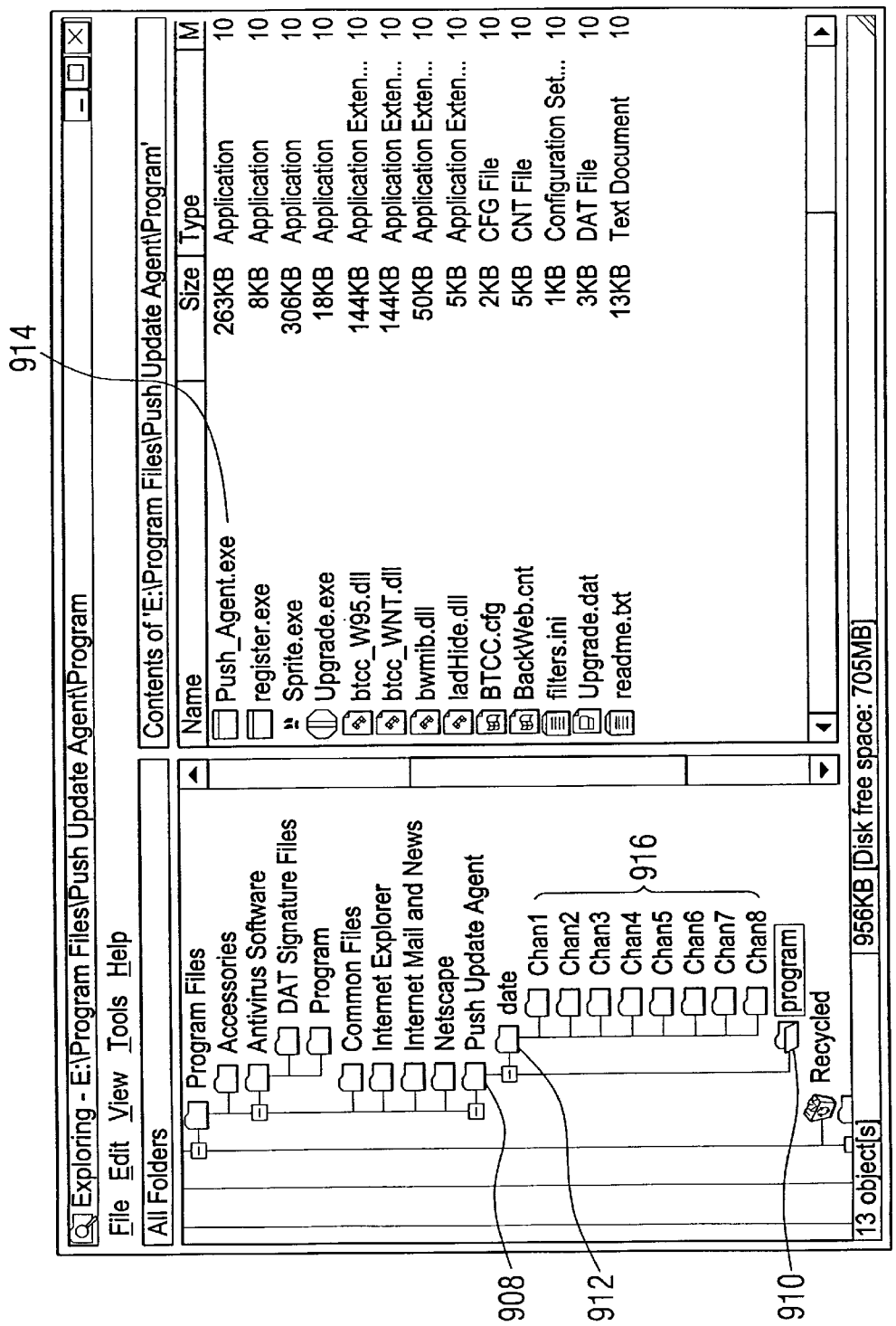

FIG. 9B also shows a printout of the contents of the program directory 910. Program directory 910 comprises a program Push_Agent.exe 914 designed to interact with push administration system 810 and supply updated information to a plurality of subscriber channels when the user of client computer 802 is connected to the Internet 804 and has activated a web browser. FIG. 9B shows channel directories 916 contained within the data directory 912. Push_ Agent.exe program 914 operates in the background, i.e. in a manner which is transparent to the user of client computer 802, and loads update information into channel directories according to the user's subscription preferences.

According to a preferred embodiment, one of the user's subscription preferences is an antivirus update channel associated with the Antivirus_Application.exe program manufacturer. Support applications for configuring the user subscription preferences may be included in the program directory 910, as shown in FIG. 9A. When the user of client computer 802 has appropriately subscribed to an antivirus update channel, update files for that channel are placed, for example, in the channel subdirectory "Chan5" shown in FIG. 9B. The Push_Agent.exe program 914 and supporting applications keep track of the subscriber channels associated with the channel directories 916.

Figure 10:
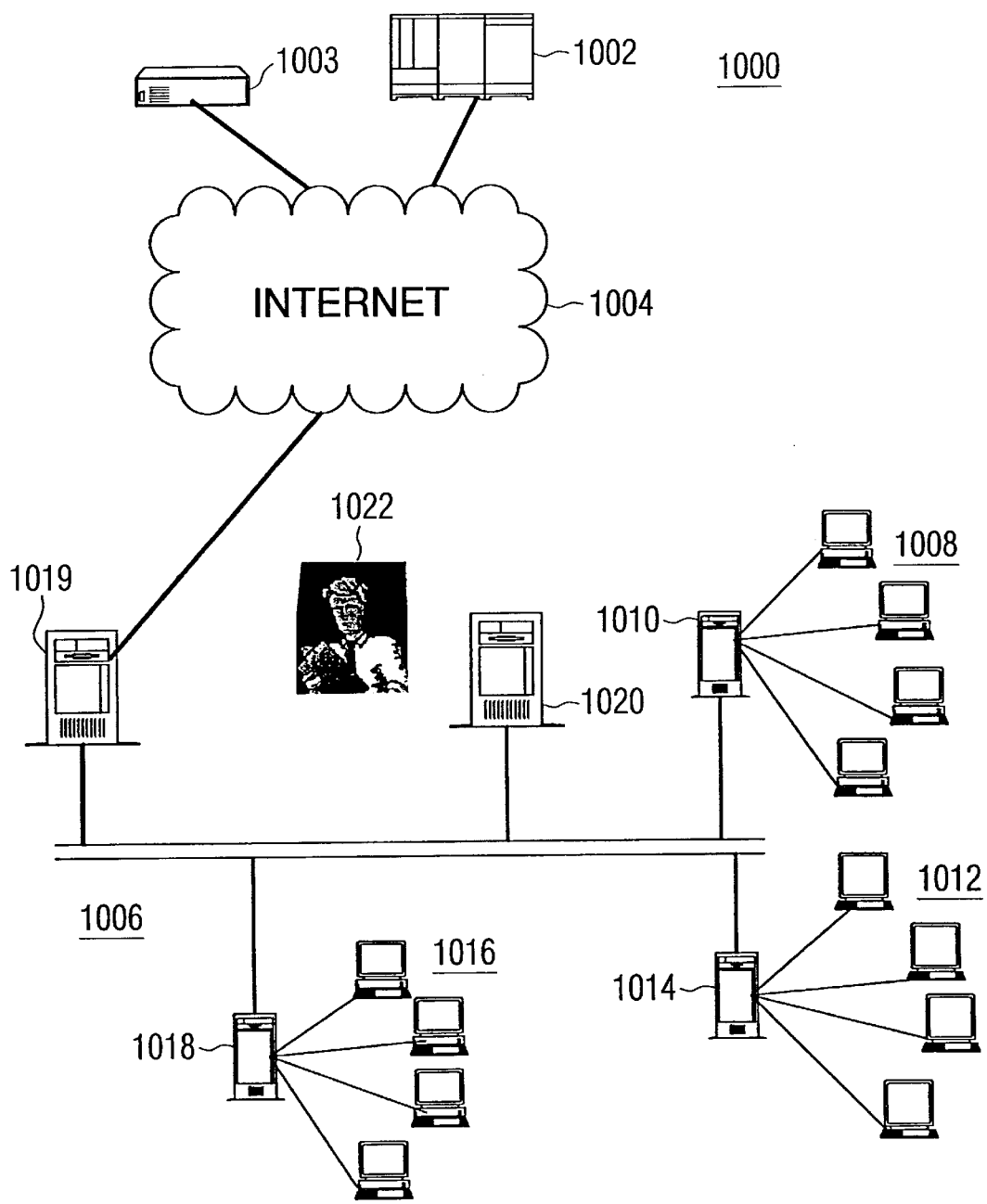
FIG. 10 shows a diagram of a computer network according to another preferred embodiment.

FIG. 10 shows a diagram of a computer network 1000 according to another preferred embodiment. Computer network 1000 comprises a central antivirus server 1002, a push administration system 1003, the Internet 1004, and a corporate computer network 1006. Although the scope of the preferred embodiment may encompass networks of any size, it is most advantageously applied to large corporate networks comprising many client computers. Accordingly, the corporate network shown in FIG. 10 comprises a large number of nodes, including: a first set of client computers 1008, which may correspond, for example, to the marketing department of a company; a local server 1010 coupled to the client computers 1008; a second set of client computers 1012 which may correspond, for example, to the finance department of a company; a local server 1014 coupled to the client computers 1012; a third set of client computers 1016 which may correspond, for example, to the engineering department of a company; a local server 1018 coupled to the client computers 1016; a gateway computer 1019 for linking corporate network 1006 to the Internet 1004, etc. The computers 1008–1019 are coupled as shown in FIG. 10, but may generally be arranged in any of a variety of corporate computer network structures.

As with most typical corporate networks, corporate network 1006 comprises a service computer 1020 coupled as shown in FIG. 10. Generally speaking, a service computer is a computer dedicated at least in part to assisting in servicing the various hardware and software applications being used in corporate computer network 1006. Such computers are typically run by system administrators, help desk administrators, or designated power users, and are referred to by various names such as help desks, administration computers, or other names. Shown in FIG. 10 is a system administrator 1022 who operates the service computer 1020 and generally configures and maintains corporate network 1006 and its hardware and software applications.

According to a preferred embodiment, service computer 1020 is loaded with a group update agent software package capable of (a) automatically receiving antivirus software updates for a variety of client computers on the corporate network 1006 according to a push technology method, and (b) automatically distributing the antivirus updates to the respective client computers, in a manner which is transparent to both the system administrator 1022 and to the users of the client computers. Advantageously, the most recent antivirus software is distributed to the client computers on corporate network 1006 without the need for affirmative action by the system administrator 1022. This can advantageously lead to increased efficiency, lower costs, and reduced human errors, while at the same time increasing client computer integrity and network efficiency.

FIG. 11 shows a portion of a database 1100 which is kept by service computer 1020 according to a preferred embodiment. The database 1100 comprises a list 1102 of client computers for which the service desk 1020 is responsible, along with information 1104 relating to their hardware versions and operating system versions. Database 1100 further comprises, for each client computer in the corporate network 1006, information 1106 related to the latest antivirus software update installation for each client computer.

Figure 12:
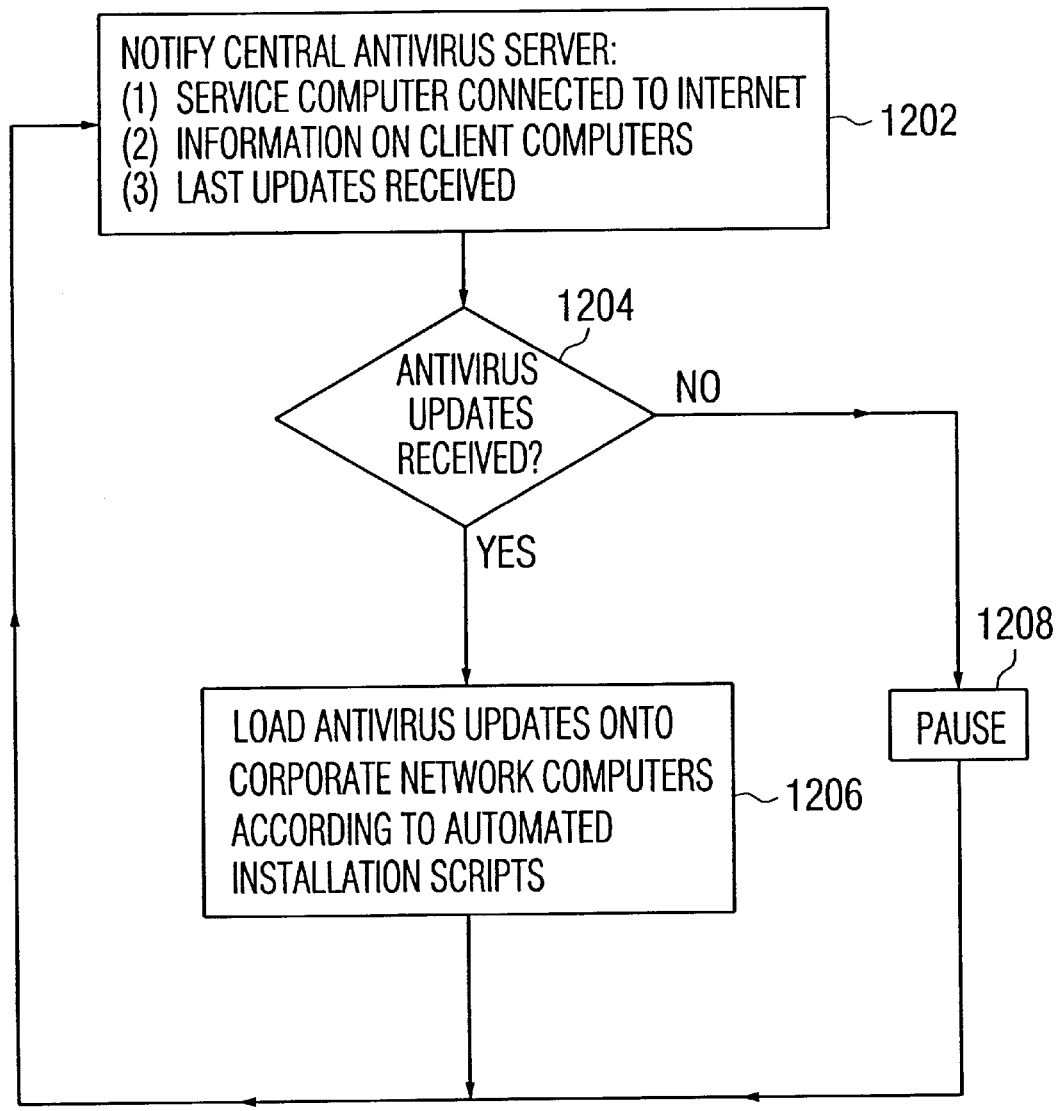
FIG. 12 shows steps taken by a local area network administration computer according to a preferred embodiment.

FIG. 12 shows steps taken by service computer 1020 according to a preferred embodiment. Service computer 1020, which usually has a dedicated or full-time connection to Internet 1004, receives antivirus information from central antivirus server 1002 according to a push technology method by periodically transmitting a packet of information to central antivirus server 1002. In particular, at step 1202, either in a single packet or multiple packets as required, service computer 1020 (a) advises the central antivirus server 1002 that service computer 1020 is attached to the Internet, (b) advises the central antivirus server 1002 of the types of computers and operating systems for which service computer 1020 is responsible, and (c) advises the central antivirus server 1002 of the latest antivirus software updates received by each type of client computer.

At step 1204, service computer 1020 receives antivirus updates, if any are required, from the central antivirus server 1002. At step 1206, the service computer automatically distributes the antivirus updates, if any are received, to the appropriate client computers. Advantageously, an automated network installation scripting procedure, such as ISEAMLESS™ from McAfee Associates, is used to distribute and install the antivirus updates. This allows for a minimum of intervention, if any, by system administrator 1022, thus allowing for increased efficiency and enhanced antivirus protection of the corporate network 1006 with the most up to date antivirus information available from central antivirus server 1002. If no updates are sent, service computer 1020 pauses at step 1208, and then steps 1202 to 1204 are repeated.

It is often the case that only a portion of the client computers of corporate network 1006 require updates from the central antivirus server. For example, overnight there may have been a new release of a signature file update for UNIX workstations onto central antivirus server 1002, but no new Windows 95 or MAC OS8 releases. In this case, the service computer 1020 would only receive the UNIX updates from central antivirus server 1002, and the automated installation procedure would distribute and install the updates only onto the UNIX client computers.

According to a preferred embodiment, central antivirus server 1002 maintains a database of information which is complementary to the information contained on service computer 1020. The corporate customer owning the corporate network 1006 generally subscribes to the central antivirus server operator for a fee, which may be a per-update fee or a fixed time period fee. In an alternative embodiment, the central antivirus server 1002 maintains a complete database for the corporate network 1006, including all of the information which was kept on the service computer 1020 as shown in FIG. 11. In this case, service computer 1020 would only transmit limited-information "pings" to central antivirus server 1002 according to a push technology method, and would send specific client computer information only when changes have occurred in corporate network 1006.

According to another preferred embodiment, a dedicated push administration system 1003 is used for distributing antivirus updates to service computer 1020 according to a push technology method. The steps performed by push administration system 1003 of FIG. 10 are similar in nature to the steps performed by push administration server 810 of FIG. 8, with added information being maintained for distributing multiple sets of antivirus information to service computer 1020 according to the database 1100.

While preferred embodiments have been described, these descriptions are merely illustrative and are not intended to limit the scope of the present invention. Thus, although the embodiments described above were in the context of a central antivirus server using "push" technology, wherein affirmative queries are sent from resident antivirus update agents on local client computers before antivirus update packages are sent, those those skilled in the art will recognize that the disclosed methods and structures are readily adaptable for broader applications. As an example, within the scope of the preferred embodiments would be a local antivirus agent which engages the central antivirus server even when the local user is not browsing the Internet. In this system, if the browser is not being used and the system is not otherwise busy (e.g. in the middle of the night), the local antivirus update agent causes the browser to connect to the Internet, whereby the push channel to the central antivirus server is then automatically invoked.

As another example, while the preferred embodiments have been described in terms of a single central antivirus server, within the scope of the preferred embodiments are multiple such servers for serving different users or types of users, and these multiple antivirus servers may be arranged in a hierarchical fashion. Within the scope of such a preferred embodiment is a system wherein each local area network antivirus server simply acts as a lowest level of an antivirus server hierarchy. Also with the scope of such a preferred embodiment is a system wherein a plurality of servers in the antivirus server hierarchy are coupled by means of private network or an alternative global network other than the Internet. Thus, while preferred embodiments have been described, these descriptions are merely illustrative, and the scope of the present invention is limited only by the appended claims.

What is claimed is:

1. A method for providing updated antivirus files to a plurality of client computers on a local area network, the client computers being supported by a common service computer on the local area network, the common service computer being operated by a system administrator, the method for providing allowing for minimal affirmative involvement by the system administrator in updating antivirus files on the plurality of client computers, the method for providing comprising the steps of:

installing the updated antivirus files on a central antivirus server, said central antivirus server comprising:
 an antivirus database, said antivirus database comprising:
 an identifier for the local area network;
 an identifier for each of the plurality of client computers on the local area network;
 a first field for storing an identifier of the operating system used by each of the plurality of client computers on the local area network; and
 a second field for storing the identity of the last updated antivirus file received by each of said plurality of computers on the local area network;
 transmitting the updated antivirus files from said central antivirus server to a push administration computer connected to the Internet;
 transmitting the updated antivirus files from said push administration computer to said service computer using push technology; and
 executing an automatic installation script at said service computer for automatically installing updated antivirus information on said plurality of client computers across the local area network; wherein said transmitting steps include:
 transmitting a ping signal from said service computer to said push administration computer, said ping signal including information identifying said service computer;
 transmitting a first query from said push administration computer to said central antivirus server, said first query requesting an identity of updated antivirus files appropriate for the service computer;
 transmitting a first response from said central antivirus computer to said push administration computer identifying said appropriate updated antivirus files; and
 transmitting said appropriate updated antivirus files from said push administration computer to said service computer.

2. A method for providing updated antivirus files to a plurality of client computers on a local area network, the client computers being supported by a common service computer on the local area network, the common service computer being operated by a system administrator, the method for providing allowing for minimal affirmative involvement by the system administrator in updating antivirus files on the plurality of client computers, the method for providing comprising the steps of:

Installing the updated antivirus files on a central antivirus server;
 receiving, at a push administration computer connected to the internet, a ping signal from said service computer, said ping signal including information identifying said service computer;
 transmitting a first query from said push administration computer to said central antivirus server, said first query for requesting updated antivirus files appropriate for the service computer;
 transmitting a first response from said central antivirus computer to said push administration computer including said appropriate updated antivirus files;
 transmitting said appropriate updated antivirus files from said push administration computer to said service computer using push technology; and executing an automatic installation script at said service computer for automatically installing updated antivirus information on said plurality of client computers across the local area network.

* * * * *